United States Patent

[11] 3,584,300

[72] Inventors Frank G. Schulz
Rahway;
Mario Antonazzi, Oradell, both of, N.J.
[21] Appl. No. 749,092
[22] Filed July 31, 1968
[45] Patented June 8, 1971
[73] Assignee The Bendix Corporation

[54] PLATEN-PATCH BOARD ASSEMBLY WITH SPRING BIASED ELECTRICAL CONTACT MEANS TO EFFECT ELECTRICAL TEST ON AN ELECTRICAL CIRCUIT CARD
5 Claims, 5 Drawing Figs.

[52] U.S. Cl. .......... 324/158, 324/72.5
[51] Int. Cl. .......... G01r 31/26, G01r 31/02
[50] Field of Search .......... 324/158 F, 72.5, 73; 174/6.8

[56] References Cited
UNITED STATES PATENTS

| | | | |
|---|---|---|---|
| 2,918,648 | 12/1959 | Ludman | 324/73X |
| 3,281,627 | 10/1966 | Fetterolf | 317/101 |
| 3,377,516 | 4/1968 | Ellett | 317/101 |

*Primary Examiner*—Rudolph V. Rolinec
*Assistant Examiner*—Ernest F. Karlsen
*Attorneys*—Herbert L. Davis and Plante, Arens, Hartz and O'Brien

ABSTRACT: A platen-patch board assembly with spring-loaded pressure pins for insertion into the platen and patch board to provide electrical contact to solder nodes of an electrical circuit card or printed circuit card for automatic fault isolation testing and including novel means for locking the pins in the platen from inadvertent displacement so that removal of the pins from the platen may be normally effected only by the utilization of a special supplementary extraction tool.

INVENTORS
FRANK G. SCHULZ
MARIO ANTONAZZI
BY Herbert L. Davis
ATTORNEY

INVENTORS
FRANK G. SCHULZ
MARIO ANTONAZZI
BY Herbert L. Davis
ATTORNEY

PLATEN-PATCH BOARD ASSEMBLY WITH SPRING BIASED ELECTRICAL CONTACT MEANS TO EFFECT ELECTRICAL TEST ON AN ELECTRICAL CIRCUIT CARD

CROSS-REFERENCE TO RELATED APPLICATIONS

The present invention relates to an improved means of making electrical contact to selected points interior to an electrical circuit of a printed circuit card under test so as to provide both quantitative, as well as qualitative, fault isolation production test equipment for such circuit cards as distinguished from merely effecting continuity testing of the circuits of multilayer circuit cards as by the provision of a roller assembly of a type such as disclosed and claimed in a copending U.S. Pat. application Ser. No. 663,336 filed Aug. 25, 1967 by Donald C. Becknell U.S. Pat. No. 3,501,698, granted Mar. 17, 1970, and assigned to The Bendix Corporation, assignee of the present invention.

The assembly of the electrical contact means described herein with reference to FIG. 3 is the subject matter of a copending U.S. Pat. application Ser. No. 48,647 filed May 13, 1970 as a division of the present application which is directed to the platen-patch board assembly described herein with reference to FIG. 1.

The platen-patch board assembly of the present invention may be embodied in a universal printed circuit card contact test fixture such as described and claimed in a copending U.S. Pat. application Ser. No. 752,076 filed Aug. 12, 1968 by Frank G. Schulz and Mario Antonazzi and assigned to The Bendix Corporation, assignee of the present invention.

BACKGROUND OF THE INVENTION

1. Field of the Invention

The invention is in the field of testing, measurement and inspection of printed circuit cards and is specifically directed to a device for use with a universal printed circuit card contact test fixture for conducting quantitative, as well as qualitative, tests on such test circuits, as well as the electrical components assembled thereon. The invention is particularly directed to an idea of means for providing electrical contact to solder nodes of printed circuit cards for automatic fault isolation testing.

2. Description of the Prior Art

Heretofore, each type of printed circuit card required a special contact test fixture for that particular circuit card, resulting in substantial design and fabrication cost and lengthy test equipment implementation time.

A number of probe devices have been heretofore utilized to sense faults in printed circuit cards, as shown in U.S. Pat. No. 2,887,622, granted May 19, 1959 to Charles C. Rayburn and Robert L. Henry and in U.S. Pat. No. 3,137,815, granted June 16, 1964 to Richard B. Hershey, and to test for continuity of electrical or electronic circuitry through the provision of a roller assembly as disclosed and claimed in the aforenoted copending U.S. Pat. application Ser. No. 663,336 filed Aug. 25, 1967 by Donald C. Becknell U.S. Pat. No. 3,501,698, granted Mar. 17, 1970, and assigned to The Bendix Corporation, assignee of the present invention. These prior references have failed to suggest the concept of the present invention in the idea of means herein provided for utilization in effecting electrical contact with the selected nodes of the printed circuit card under test through the use of an interchangeable platen-patch board assembly, including a plurality of spring-loaded pressure pins inserted into a predetermined pattern of holes provided in the platen and the patch board.

A further problem in the provision of such test equipment for printed circuit cards is to provide a uniform pressure contact surface with the irregular nodule surface of the printed circuit card to be tested so as not to injure the card or make a faulty contact. Presently available pressure pins which endeavor to fulfill this requirement either require a press fit into a mounting hole with a consequent close diametrical tolerance on the hole, or other such prior type pressure pins may require the application of an adhesive to anchor the pressure pin in the mounting hole. Such prior type pressure pins in the current state of the art do no permit easy insertion and removal of the pressure pin from its mounting hole, whereas in the spring-loaded pressure pins of the present invention, these pins are of a novel "poke home" pressure pin-type which permits prior assembly of such a pressure pin in the platen and its associated electrical plug connector in a prefabricated electrical patch board.

A U.S. Pat. Ser. No. 3,173,740, granted Mar. 16, 1965 to Robert E. Barnes discloses a self-locking electrical plug connector of a structural arrangement such that substantial pull on the conductor wire of the rear portion of the connector body will effect removal thereof from a locking relation in a mounting hole while in the present invention the spring-biased "poke home" pressure pin as described and claimed in the aforenoted U.S. Pat. Application Ser. No. 48,647, includes a barrel element in which there is mounted a compression spring and a plunger carrying a contact pin under the biasing force of the compression spring so as to provide, as distinguished from the plug connector of U.S. Pat. Ser. No. 3,173,740, a uniform pressure contact surface with the irregular nodule surface of a printed circuit board under test. As a further distinction, in the present invention, there is provided a retention spring cap holder mounted at the end of the barrel element and functioning in a sense to retain the plunger in the barrel element under the biasing force of the spring, and the retention spring cap holder having outwardly flared resilient tangs acting in a sense to retain the barrel element in the mounting hole of the platen in a locked relation upon the barrel element being inserted through the mounting hole. Thus the resilient tangs of the retention spring hold the barrel element of the pressure pin from withdrawal except through the use of a supplemental extraction tool and which concept is entirely different from the releasable self-locking electrical plug connector of the U.S. Pat. Ser. No. 3,173,740.

Such "poke home" pressure pin of the present invention may be readily installed manually in the platen and without supplementary tools, but may be disassembled from the platen only through the provision of a special tool, thus preventing inadvertent displacement of the pressure pin during use thereof in the testing.

SUMMARY OF THE INVENTION

The invention contemplates an interchangeable platen-patch board assembly with a matrix of spring-loaded pressure pins inserted through the platen and patch board for use in a universal printed circuit card contact test fixture of a type disclosed and claimed in the aforenoted U.S. Pat. Application Ser. No. 752,076 filed Aug. 12, 1968 by Frank G. Schulz and Mario Antonazzi, joint inventors of the present invention, and assigned to The Bendix Corporation, the assignee of the present invention.

The present invention further contemplates the provision of contact probe means for use in the aforenoted platen-patch board assembly to effect discrete electrical contact with conductive terminals of a multilayer printed circuit card so that there may be effected by the assembly in a test fixture quantitative and qualitative measurements of the circuitry, as well as tests and measurements of electrical components that may be carried by the card, as may be deemed necessary, including measurements across resistor elements, polarity of diodes and operation of each electrical component, together with tests of electrical tolerances thereof.

An object of the invention is to provide for use in a printed circuit card contact test fixture an operator-operative means for effecting electrical contact to selected nodes of the printed circuit card under test through the provision of an interchangeable platen and patch board assembly, including a matrix of spring-loaded pressure pins inserted into the platen and the patch board and which spring-loaded pressure pins provide a means for making electrical contact in one sense with the selected nodes of the electrical circuit or printed circuit card under test, as well as in another sense with electrical equipment to conduct the test.

Another object of the invention is to provide a platen and patch board assembly for use in a test fixture in which a portion of the test programming may be effectively accomplished in such an assembly so as to thereby reduce the amount of programming required in the ancillary electrical switching or scanning devices.

Another object of the invention is to provide means whereby selective testing of portions of the printed circuit card may be achieved by utilization of a platen, or master board, in which holes formed in the platen, or master board, for mounting a contact probe means may in effect be located in an identical pattern to that of the holes formed for the solder nodes of the printed circuit card under test, so that except for the thickness of the platen and the diameter of the node holes the mounting holes formed in the platen will correspond to the node holes of the particular printed circuit card to be tested thereon.

A further object of the invention is to provide for use in a universal printed circuit card contact test fixture a platen and patch board assembly so arranged as to permit rapid changeover to new card testing with a minimal amount of new parts fabrication in that only the platen component of the assembly need be fabricated and programmed to meet the requirements of each different type printed circuit card.

A further object of the invention is to provide pressure pins described and claimed in the aforenoted U.S. Pat. Application Ser. No. 48,647, to be inserted in the pattern of holes formed in the platen for contacting the solder nodes of the printed circuit card under test so as to effect a uniform pressure contact surface with the irregular node surfaces and which pressure pins may be removed from the platen only by use of a supplementary extraction tool so as to prevent inadvertent removal or displacement thereof.

A further object of the invention is to provide an electrical patch board in which patch board plugs may be readily inserted while interconnected spring-biased pressure pins may be selectively inserted through the aforenoted platen to effect electrical contact with nodes of the printed circuit card while inadvertent withdrawal of the pressure pins are prevented by the locking action of a retention spring which may be released and the pins retracted only by the operation of a supplementary retraction tool.

Another object of the invention is to provide as described and claimed in the aforenoted U.S. Pat. Application Ser. No. 48,647, a spring-biased "poke home" pressure pin for selectively making electrical contact with the solder nodes of a printed circuit card under test and including a barrel, a compression spring and plunger slidably mounted in the barrel and the plunger supporting the pressure pin under the biasing force of the spring, and the barrel carrying a novel retention spring so arranged as to provide freedom of movement of the barrel relative to the mounting hole in a lateral direction and so that the retention spring may pass through the mounting holes formed in the platen of varying degrees of tolerance, while the compression spring permits freedom of movement of the pressure pin supported by the plunger along the longitudinal axis of the pressure pin so the variance in the plane of contact of the printed circuit card or solder rivers and nodes thereon are compensated by a movement of the plunger under the biasing force of the compression spring, and further the retention spring includes outwardly flared tangs which may be biased inwardly so as to permit an easy manual insertion of the barrel of the pressure pin into the mounting hole of the platen from an underside surface of the platen, while upon complete insertion of the barrel into the mounting hole the outwardly flared tangs of the retention spring effect a locking action at an upper opposite side surface of the platen which effectively prevents an inadvertent withdrawal of the "poke home" pressure pin from the platen mounting hole.

Another object of the invention is to provide such a "poke home" pressure pin which may be removed from the mounting hole of the platen only by the use of a supplemental tool effective to compress the locking tangs of the retention spring simultaneously with the withdrawal of the barrel through the mounting hole of the platen.

These and other objects and advantages of the invention are pointed out in the following description in terms of the embodiment thereof which is shown in the accompanying drawings.

DESCRIPTION OF THE DRAWINGS

Referring to the Drawings in which corresponding numerals indicate corresponding parts in the several views.

DESCRIPTION OF THE INVENTION

Platen-Patch Board Assembly

Figure 1:
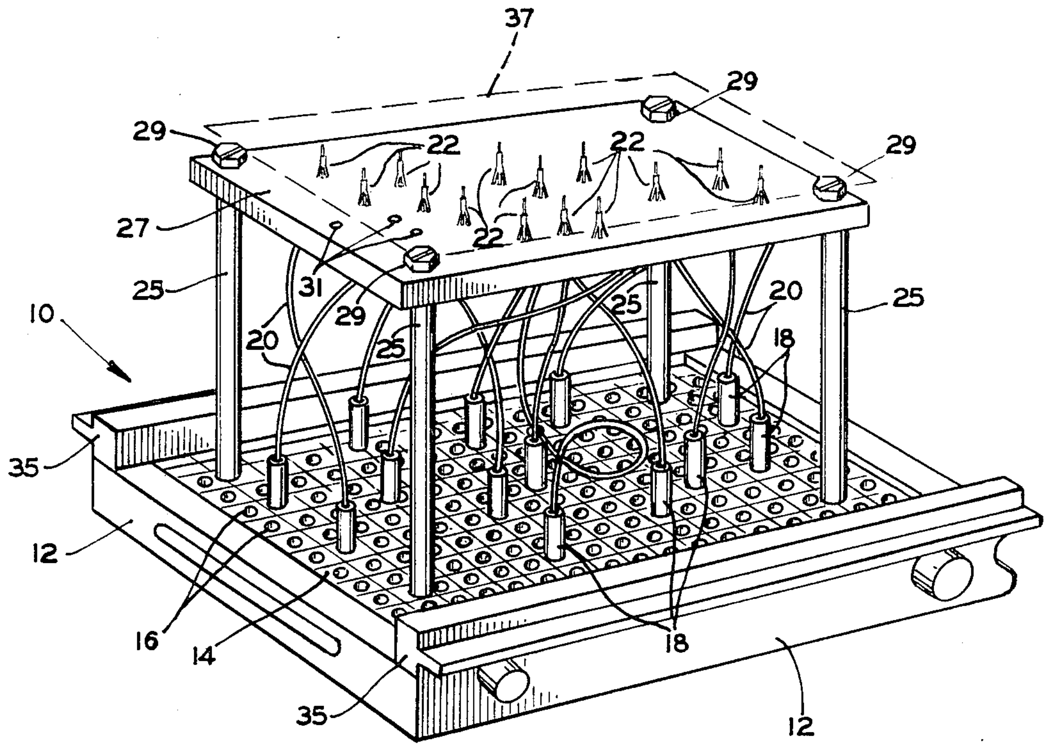
FIG. 1 is a top plan perspective view of a platen-patch board assembly embodying the present invention and which may be utilized in a universal printed circuit card contact test fixture of a type such as disclosed and claimed in a copending U.S. Pat. Application Ser. No. 752,076 filed Aug. 12, 1968 by Frank G. Schulz and Mario Antonazzi and assigned to The Bendix Corporation, assignee of the present invention.
Figures 2, 3, 4, 5:
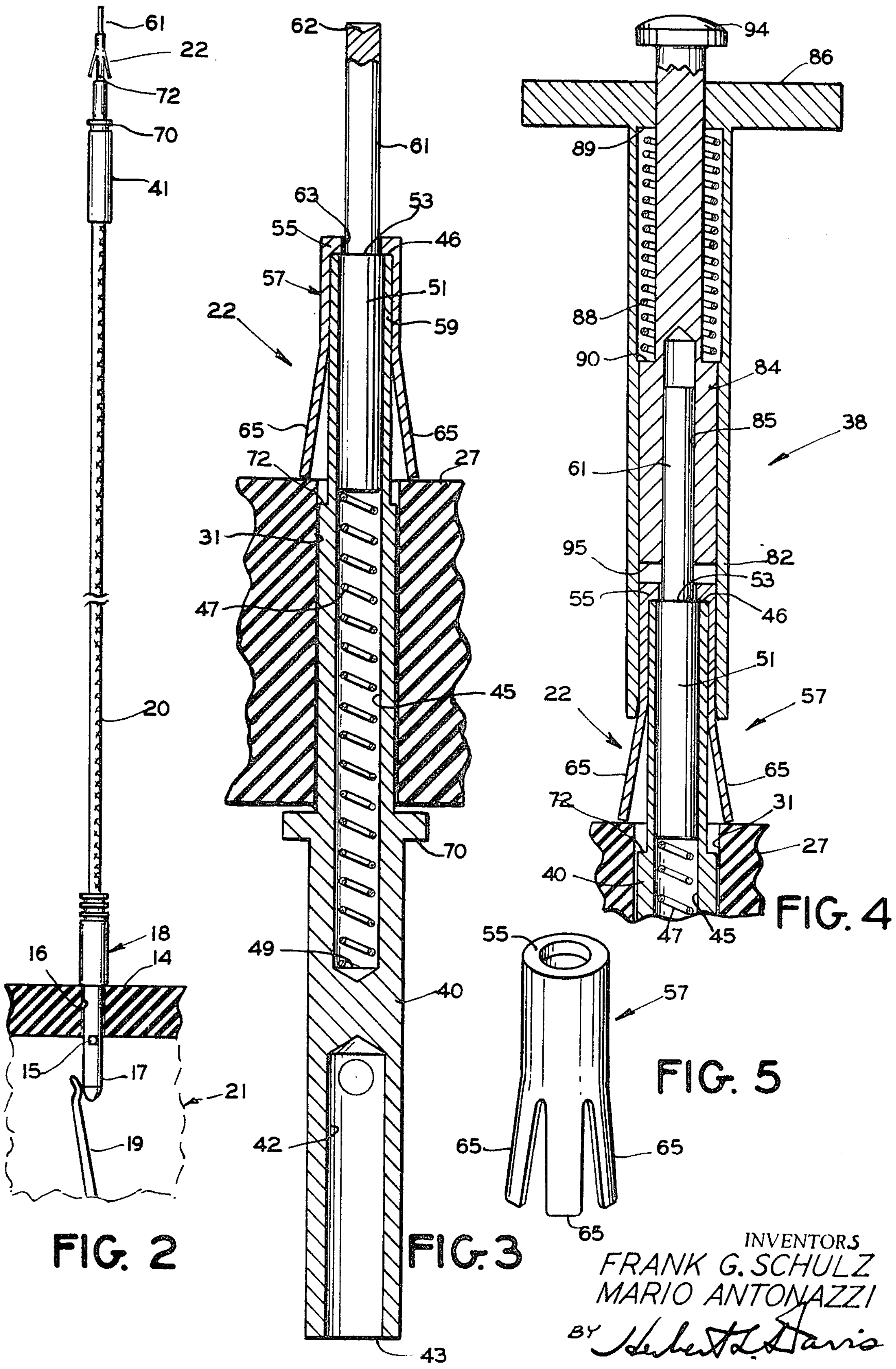
FIG. 2 is a longitudinal side view of a patch cord assembly embodying the present invention and showing at one end of an electrical conductor cord a self-locking electrical plug connector shown inserted in a patch board grid hole while at the opposite end of the patch cord there is electrically connected a spring-biased "poke home" pressure pin embodying the present invention for insertion in a mounting hole of the platen.
FIG. 3 is an enlarged longitudinal sectional view of the "-poke home" pressure pin of FIG. 2, showing the pressure pin in a loose fit in the mounting hole of the platen and in a locked relation with the upper side surface of the platen.
FIG. 4 is a longitudinal sectional view of an extraction tool in an operative relation with the retention spring of the "poke home" pressure pin for releasing the pin from the locked relation of FIG. 3.
FIG. 5 is an enlarged perspective view of the retention spring of the "poke home" pressure pin and illustrating the outwardly flared resilient locking tangs of the retention spring.

Referring now to FIG. 1, a novel platen-patch board assembly is indicated generally by the numeral 10. The platen-patch board assembly 10 includes a rectangular shaped box 12 having mounted therein a patch board 14 of conventional type including a multitude of grid holes 16. Each of these grid holes 16 serves to releasably receive therein an electrical patch board plug connector 18. Each of the patch board plug connectors 18 may be of a conventional type and includes a body portion 17 which protrudes through the patch board 14 so as to make electrical connection with suitable electrical connectors or prongs 19 of a panel receiver assembly 21, as shown by FIG. 2, for electrical connection to a test apparatus, as explained in the copending U.S. Pat. Application Ser. No. 752,076 filed Aug. 12, 1968 by Frank G. Schulz and Mario Antonazzi assigned to The Bendix Corporation, assignee of the present invention. A spring-biased ball 15 mounted in the body portion 17 serves to releasably lock the plug connector 18 in the selected grid hole 16 of the patch board 14 in a conventional manner.

Further each of the patch board plugs 18 has electrically connected thereto one end of a resilient electrically conductive patch cord 20 which is electrically connected at the opposite end to a "poke home" pressure pin assembly 22.

Furthermore, as shown by FIG. 1, there are provided four electrically insulated supporting posts 25 positioned in a convenient spaced relation. Each of the supporting posts 25 have mounted at the lower ends thereof a mounting plug to be received in selected mounting holes 16 of the patch board 14, while opposite upper ends of the supporting posts 25 are positioned in mounting holes provided in a platen or master board 27 and secured therein by suitable releasable fastening bolts 29. The platen 27 is formed of a suitable electrical insulating material and is supported by the posts 25 in a position corresponding approximately to the center of the patch board 14.

The platen 27 has formed therein a pattern of pressure pin mounting holes 31 which are of an identical pattern and location to that of the holes formed in the printed circuit card under test for receiving the solder nodes of such printed circuit card. The formation in the platen 27 of the pressure pin mounting holes 31 may be made from the same equipment required to produce the hole pattern of the printed circuit card so that the holes formed in the platen will correspond to the holes formed in the printed circuit card.

A number of the "poke home" pressure pins 22 are inserted into the respective selected mounting holes 31 of the platen 27 while the patch plug 18 in each instance is positioned in a selected grid hole 16 of the patch board 14 so as to effect a predetermined electrical connection through the panel receiver assembly 21 to an electrical test apparatus as explained in the aforenoted U.S. Pat. Application Ser. No. 752,076. Further, tracks 35 are suitably fastened at the upper edge of the patch box 12 in spaced parallel relation so that the platen-patch board assembly 10 may be assembled in a universal printed circuit card contact test fixture, as heretofore explained with reference to the aforenoted U.S. Pat. Application Ser. No. 752,076. As indicated by the dash lines 37 of FIG. 1, the test fixture is arranged to support a printed circuit card under test in an operative relation to the contact probes or spring-biased "poke home" pressure pins 22 as heretofore explained in the aforenoted U.S. Pat. Application Ser. No. 752,076.

Electrical continuity is then made between the plurality of pressure pins 22 inserted in the platen 27 and the nodes and rivers of the printed circuit card under test as selectively contacted by the pressure pins 22. Moreover, through the respective patch board plugs 18 positioned in selected grid holes 16 of the patch board 14 and electrically connected through the patch board cords 20 to the pressure pins 22 and through the electrical connector prongs 19 of the panel receiver assembly 21 to the test equipment, selected points interior to the printed circuit card under test may be subject to both quantitative, as well as qualitative, fault isolation production tests provided by the test equipment electrically connected to the panel receiver assembly 21 and the connector prongs 19 thereof.

The use of the easily installed and removable platen 27 of the platen-patch board assembly 10 provides a platen or master board 27 which may be accurately formed so as to cause the pressure pin mounting holes 31 therein to correspond identically in position with the solder node holes of the printed circuit card under test, by utilization of the same equipment or template to form both. The platen 27 may be readily programmed then with the pressure pins 22 inserted through the mounting holes 31 into contacting relation with the solder nodes positioned in corresponding relation thereto on the printed circuit card under test. Further through the provision of the combination of the platen 27 and pressure pins 22, together with the patch board plugs 18 inserted through the patch board 14 so as to make predetermined connections with the test equipment through the panel assembly receiver 21, there is provided a unique platen-patch board assembly which facilitates rapid change to new card testing with a minimal amount of new part fabrication.

The platen 27 may be readily replaced by removing the fastening bolts 29 and substituting a second platen for the original platen 27. Thus, in order to meet the requirements for testing a different printed circuit card, it would be necessary merely to fabricate the second platen 27 with a pattern of mounting holes 31 so positioned as to correspond to the node hole pattern of the different printed circuit card and the programming of the patch board plugs 18 in the selected grid holes 16 of the patch board 14 so as to effect predetermined connections with the test equipment through the panel assembly receiver 21 to provide the desired tests.

Moreover, through a novel locking means, the spring-biased pressure pins 22 are retained in the mounting holes 31 against inadvertent displacement which might otherwise result from the contacting pressures applied thereto by the printed circuit card under test. The pressure pins 22 being normally releasable from the locked relation in the mounting holes of the platen 27 only through an operator-operative supplemental extraction tool 38 illustrated in FIG. 4 and hereinafter explained.

A feature of the platen-patch board assembly 10 resides in its flexibility in providing electrical contact to selected nodes of a printed circuit card under test through an interchangeable platen 27 including a matrix of spring-loaded pressure pins 22 inserted in mounting holes 31 in the platen 27 positioned in corresponding relation to the nodes of the printed circuit card subject to the test.

Spring-Biased "Poke Home" Pressure Pin

Novel structure of the spring-biased "poke home" pressure pin 22 is shown in detail in FIG. 3 and includes a barrel element 40 having a longitudinal channel 42 therein opening at one end 43 of the barrel element 40. One end of the electrical conductor patch cord 20 may be secured in the channel 42 to the barrel element 40, while extending through an opposite end portion of the barrel element 40 is a second longitudinal channel 45 opening at an opposite end 46 of the barrel element 40. There is mounted in the channel 45 a compression spring 47. One end 49 of the spring 47 bears on an inner end of the longitudinal channel 45, while an opposite end of the spring 47 bears upon an inner end portion of a plunger 51 slidably mounted in an open ended portion of the longitudinal channel 45.

As shown by FIG. 2, a tubular insulation member 41 fits over an end portion of the patch cord 20 and the barrel element 40 adjacent an annular flange 70 provided on the barrel element 40.

The plunger 51 has an annular shoulder portion 53 engageable by an annular flange portion 55 projecting inwardly from the outer end portion of a retention spring cap holder 57 secured about the open end 46 of the barrel element 40. The spring cap holder 57 is suitably secured or press fitted about an outer end portion 59 of the barrel element 40. The inwardly projecting annular flange portion 55 of the retention spring 57 serves to contact the annular shoulder portion 53 of the plunger 51 so as to limit the outward movement of the plunger 51 under the biasing force of the compression spring 47. Thus, the plunger 51 is prevented from being pushed by the compression spring 47 out of the open end 46 of the longitudinal channel 45 of the barrel element 40.

An electrical contact pin 61 projects axially from the plunger 51 through an opening defined by the inwardly projecting flange portion 55 of the retention spring cap holder 57. The contact pin 61 is normally biased outwardly under the pressure applied by the compression spring 47 against the plunger 51 so as to cause an outer contact surface 62 of the pin 61 to contact with a uniform pressure an irregular nodule surface of the printed circuit card 37 under test. The compression spring 47 acts in an opposing relation to a pressure applied against the outer contact surface 62 of the pin 61 so that the plunger 51 may be caused to move inwardly under such pressure against the compressive force of the spring 47.

The lower end portion of the retention spring 57 includes outwardly flared resilient tangs or skirt portions 65, as shown by FIGS. 3, 4 and 5, so arranged that upon the "poke home" pressure pin 22 being inserted in a mounting hole 31 of the platen 37 the flared resilient tangs 65 of the retention spring 57 would be engaged by the adjacent wall surrounding the mounting hole 31 and compressed inwardly so as to decrease in diameter size until the assembly of the retention spring 57 passes through the mounting hole 31, whereupon the resilient tangs 65 will expand under the spring force thereof to the locking positions shown in FIG. 3, In the latter position, the expanded tangs 65 will engage the upper surface of the platen 27 so as to prevent the retraction or backward movement of the pressure pin assembly 22 relative to the mounting hole 31, while inward movement of the barrel element 40 is effectively limited by the annular flange portion 70 provided on the barrel element 40 in a longitudinal spaced relation to the end 46 of the barrel element 40.

In addition, the barrel element 40 has provided thereon an annular shoulder 72 positioned in an intermediate longitudinal spaced relation to the end 46 of the barrel element 40 and the annular flange portion 70. The annular shoulder 72 provides a recess so arranged as to receive therein the ends of the tangs 65 upon the same being compressed inwardly.

Extraction Tool

In order to remove the "poke home" pressure pin 22 from the mounting hole 31 of the platen 27 in which the pressure pin 22 has been inserted in the locked relation, shown by FIG. 3, it is necessary to use an extraction tool, such as shown in FIG. 4, and indicated generally by the numeral 38. The extraction tool 38 includes a sleeve portion 82 slidably mounted on a body portion 84 having a recess 85 which fits over an end portion of the contact pin 61. The sleeve portion 82 has an operative end portion which fits over the upper end of the retention spring cap holder 57. The sleeve 82 may be slidably actuated relative to the body portion 84 by a force being applied by an operator to an actuating element 86 against the biasing force of a spring 88 mounted between a shoulder 89 of the sleeve 82 and a shoulder 90 of the body portion 84. This force applied by the operator at the actuating element 86 will then cause the sleeve portion 82 to bias the tangs 65 inwardly into the recess provided by the annular shoulder 72 and free of the upper surface of the platen 27.

A plunger 94 operatively connected to the body portion 84 may then be forced inwardly by the operator relative to the sleeve 82 so as to cause the inner end 95 of the body portion 84 to bear upon the flange portion 55 of the retention spring 57 and in turn cause the "poke home" pressure pin 22 to be longitudinally extracted from the mounting hole 31 free of the locking action of the tangs 65 of the retention spring 57.

Although only one embodiment of the invention has been illustrated and described, various changes in the form and relative arrangements of the parts, which will now appear obvious to those skilled in the art may be made without departing from the scope of the invention. Reference is, therefore, to be had to the appended claims for a definition of the limits of the invention.

What we claim is:

1. For use with test fixture to conduct electrical tests on an electrical circuit card; a device comprising a patch board, a platen, means for mounting the platen in spaced relation to the patch board, spring-biased electrical contact means projecting through the platen for effecting electrical contact with irregular surfaces of nodes of the electrical circuit card under test, electrical plug means electrically connected to the contact means and selectively positioned in the patch board for operative connection to test equipment, the electrical contact means including a plurality of spring biased contact pins, and means for carrying each of the spring-biased contact pins, the nodes of the electrical circuit card being formed in a predetermined pattern, and the platen having mounting holes formed in a pattern corresponding to the pattern of the nodes of the electrical circuit card, and the means for carrying each of the spring-biased contact pins being positioned in said mounting holes, each of said carrying means including outwardly flared resilient tangs effective upon the carrying means being selectively inserted through the mounting holes for locking the carrying means therein so as to render the spring-biased contact pins effective to apply a uniform pressure contact surface for making the electrical contact with the correspondingly positioned nodes of the electrical circuit card.

2. For use with a test fixture to conduct electrical tests on an electrical circuit card; a device comprising a patch board, a platen, means for mounting the platen in spaced relation to the patch board, spring-biased electrical contact means projecting through the platen for effecting electrical contact with irregular surfaces of nodes of the electrical circuit card under test, electrical plug means electrically connected to the contact means and selectively positioned in the patch board for operative connection to test equipment, the means for mounting the platen in spaced relation to the patch board including supporting post means mounted in the patch board and including means for securing the platen on the supporting post means in spaced relation to the patch board, the electrical contact means including a plurality of spring-biased contact pins, and means for carrying each of the spring-biased contact pins, the nodes of the electrical circuit card being formed in a predetermined pattern, and the platen having mounting holes formed in a pattern corresponding to the pattern of the nodes of the electrical circuit card, and the means for carrying each of the spring-biased contact pins being positioned in said mounting holes, each of said carrying means including outwardly flared resilient tangs effective upon the carrying means being selectively inserted through the mounting holes for locking the carrying means therein so as to render the spring-biased contact pins effective to apply a uniform pressure contact surface for making the electrical contact with the correspondingly positioned nodes of the electrical circuit card.

3. For use with a test fixture to conduct electrical tests on an electrical circuit card; a device comprising a patch board, a platen, means for mounting the platen in spaced relation to the patch board, spring-biased electrical contact means projecting through the platen for effecting electrical contact with irregular surfaces of nodes of the electrical circuit card under test, electrical plug means electrically connected to the contact means and selectively positioned in the patch board for operative connection to test equipment, the platen including at least one mounting hole for the contact means, and the contact means including an elongated barrel element adapted to be selectively disposed so as to have one end thereof inserted through the mounting hole of the platen, a spring-biased electrical contact pin projecting from said one end of said barrel element for making a resilient electrical contact with an irregular surface node of the electrical circuit card, a retention spring means mounted on said barrel element adjacent said one end, and said retention spring means including projecting resilient elements for locking the barrel element from withdrawal upon said one end of the barrel element being inserted through the mounting hole so as to render the resilient elements of the retention spring means mounted adjacent said one end of the barrel element effective in said locking relation.

4. The device defined by claim 3 in which said retention spring means includes a retention spring cap holder mounted on said barrel element adjacent said one end, said spring cap holder being effective in a sense to limit movement of the spring-biased electrical contact pin from said one end of the barrel, and the projecting resilient elements of the retention spring means including outwardly flared tangs projecting from the retention spring cap holder and effective in a sense to lock the barrel element from withdrawal from the mounting hole of the platen.

5. The device defined by claim 3 in which the barrel element includes a first longitudinal channel therein opening at said one end, a plunger carrying the electrical contact pin and slidably mounted in said first channel, a compression spring having one end bearing upon a closed end of the first channel and an opposite end bearing upon the plunger to bias the plunger and thereby the electrical contact pin toward the open end of the first longitudinal channel the retention spring means includes a retention spring cap holder mounted on said barrel element adjacent said open end of said first longitudinal channel, said spring cap holder being effective in a sense to prevent movement of the plunger from said open end of the first longitudinal channel while permitting the electrical contact pin carried by the plunger to be biased by the compression spring through the open end of the first longitudinal channel into electrical contact with an irregular surface node of the electrical circuit card, the projecting resilient elements of the retention spring means including outwardly flared resilient tangs projecting from the retention spring cap holder and effective in a sense to lock the barrel element from withdrawal from the mounting hole of the platen, and a second longitudinal channel in the barrel element opening at an opposite end of the barrel element for receiving an electrical conductor leading to the electrical plug means selectively positioned in the patch board for operative connection to test equipment.